May 20, 1969   E. J. SOLTYSIK   3,444,596
PIPE CLIP
Filed Jan. 31, 1968
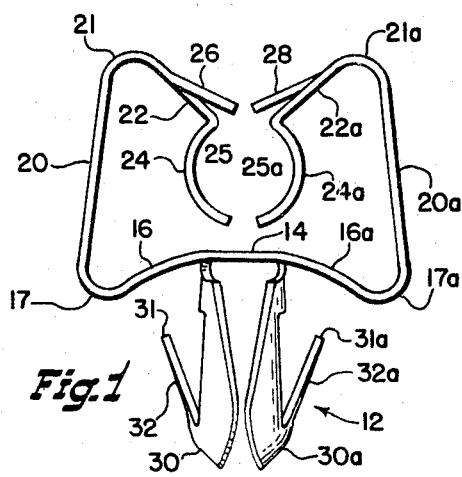
Fig. 1
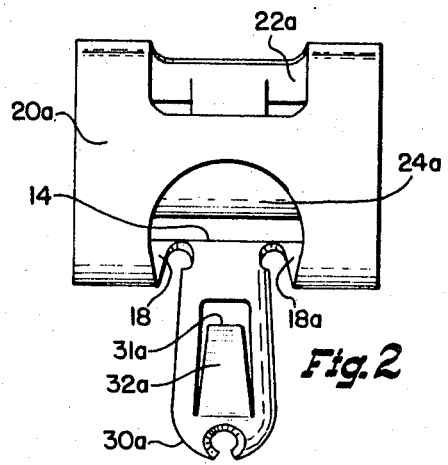
Fig. 2
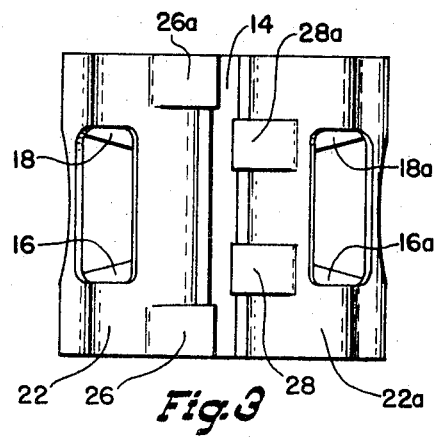
Fig. 3
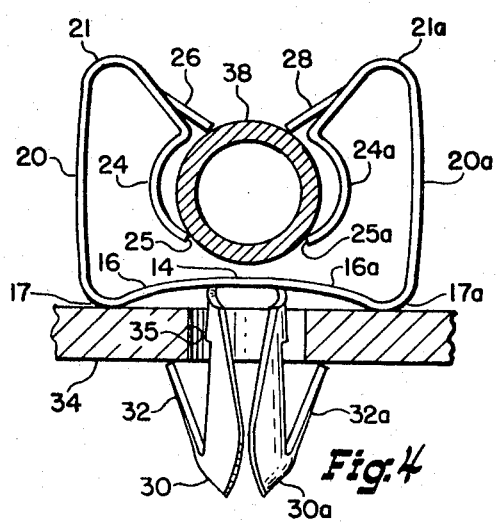
Fig. 4
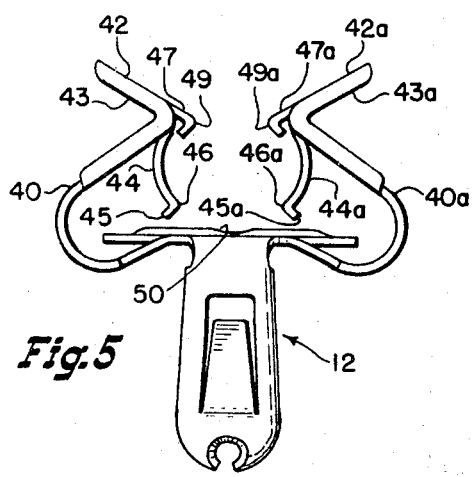
Fig. 5
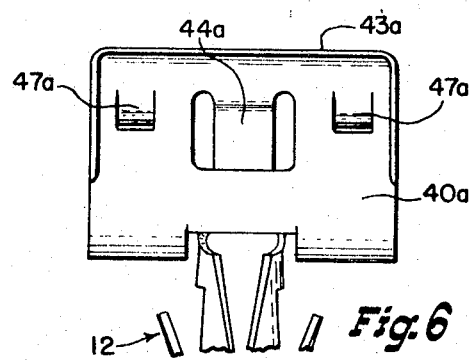
Fig. 6
INVENTOR.
Edmund J. Soltysik
BY
His Att'ys

United States Patent Office 3,444,596
Patented May 20, 1969

3,444,596
PIPE CLIP
Edmund John Soltysik, Chicago, Ill., assignor to Illinois Tool Works Inc., Chicago, Ill., a corporation of Delaware
Filed Jan. 31, 1968, Ser. No. 702,091
Int. Cl. F16b 2/24; F16l 3/12
U.S. Cl. 24—73                        6 Claims

ABSTRACT OF THE DISCLOSURE

A resilient sheet material clip for mounting elongate workpieces, such as rods, tubes, cables and the like to an apertured work support and including a stud portion extending through the work support aperture and a head portion having opposed gripping formations to grippingly accommodate workpieces of varying cross-sectional dimensions within predetermined size ranges.

---

The invention relates to new and useful improvements in a resilient sheet material fastener and more particularly to resilient sheet metal clips for retaining elongate workpieces in predetermined position with respect to an apertured support.

An object of the invention is to provide a resilient sheet material clip including a stud portion to be mounted in a work support aperture and a head portion having gripping means for supporting a workpiece in semi-positive position preventing inadvertent removal thereof.

Another object of the invention is to provide a sheet material clip substantially of the above type wherein the head portion includes spring arms carrying means for gripping the workpiece at peripherally spaced points and adapted to maintain the same in a more or less floating position spaced from the base of the clip.

A further object of the invention is to provide a sheet material clip substantially of the above type which will accommodate workpieces of varying cross-sectional dimensions within predetermined ranges.

The invention still further aims to provide a resilient sheet material clip formed from a single blank of material suitably shaped in convenient manner into the head and stud configurations.

The above and other objects of the invention will in part be obvious and will be hereinafter more fully pointed out.

In the accompanying drawing:

FIG. 1 is an end elevation of one form of clip showing the head and stud portions;

FIG. 2 is a side elevation of FIG. 1;

FIG. 3 is a top plan view of FIG. 1;

FIG. 4 is an end view similar to FIG. 1 showing the clip gripping a workpiece and mounted in an apertured work support shown in sections;

FIG. 5 is an end view of a modified form of clip; and

FIG. 6 is a side elevation of FIG. 5.

Referring more in detail to the accompanying drawing, and particularly with reference to FIGS. 1 through 4, the clip is formed from a single blank of sheet metal or like resilient material and includes a head portion 10 and a stud portion 12 integrally connected together along a longitudinal base strip 14. At the ends of the base strip 14, there are provided pairs of laterally extending arms 16, 16a and 18, 18a which are directed downwardly from the base strip and present therewith a concave shape formation facing the stud portion 12. The arms 16, 16a and 18, 18a have the ends thereof curved to merge into oppositely extending skeleton sidewalls 20, 20a which in effect provide connected arms joined to the concave arms along downwardly facing bearing areas (see 17, 17a in FIG. 1). The upper ends of the sidewall arms 20, 20a are curved inwardly and downwardly toward one another as at 21, 21a (see FIG. 1) and continuations thereof provide arm portions 22, 22a. These arm portions 22, 22a terminate in arcuate portions 24, 24a facing one another and providing terminal gripping edges 25, 25a. The downwardly inclined arm portion 22 is provided with spring fingers 26, 26a struck from the material thereof and inclined with respect thereto. Similarly, the arm portion 22a is provided with spring fingers 28, 28a struck from the material thereof and extending toward the fingers 26, 26a. The terminal edges of these spring fingers provide additional workpiece gripping edges as will be described below.

The stud portion 12 includes a pair of arms 30, 30a depending centrally from the base strip 14. These arms 30, 30a are of transversely curved cross-section concave toward one another. Lugs 32, 32a are struck from the material of the arms 30, 30a, respectively, and are bent outwardly to present edge shoulders 31, 31a facing the head portion 10.

A work support 34 is shown in FIG. 4 with an aperture 35 therethrough. The clip may be assembled to the work support by passing the stud portion 12 through the aperture 35. In so assemblying the clip to the work support, the stud arms 30, 30a will be forced inwardly toward one another and in turn the arms 32, 32a will be forced inwardly toward the respective stud arms 30, 30a as they pass through the work support aperture 35. Then, the arms 32, 32a will spring outwardly as shown in FIG. 4 with the edge shoulders 31, 31a bearing tightly against the adjacent surface of the work support. In this position, the arms 16, 16a and 18, 18a are stressed to reduce the concavity thereof, as shown in FIG. 4, with the bearing edges 17, 17a engaging the adjacent surface of the work support under stress.

With the clip assembled to the work support 34, as illustrated in FIG. 4, the work piece 38 is shown gripped between the edges of the fingers 26, 26a and 28, 28a, as well as the terminal edges 25, 25a of the arcuate portions 24, 24a, respectively. The edges of the fingers as well as the edges of the arcuate portions present biting edges which may dig into the surface of the work piece for firmly gripping the same and holding the same elevated from the base 14 of the clip as shown. In assembling the work piece with the clip, the work piece is urged downwardly against the fingers 26, 26a, 28, 28a to expand the arm portions 22, 22a to a position where it will pass between the ends of the fingers which then spring back with the arm portions to grip the work piece in the position shown.

In instances where it would be undesirable to perhaps mar the surface of the supported work piece, a slightly modified type of clip is shown in FIGS. 5 and 6. In this form of clip, the stud portion 12 is substantially identical to that previously described. However, the head portion is slightly modified in that the arms 40, 40a are directed inwardly toward each other at a more acute angle and the free ends of these arms are reversely bent outwardly as at 42, 42a. A strengthening flange 43, 43a extends along the arm portions 40, 40a and the reversely bent portions 42, 42a. Struck from the arm portions 40, 40a are two centrally disposed arcuate portions 44, 44a concave toward one another and with the free edges 45, 45a thereof reversely bent to present smooth gripping edge portions 46, 46a. Struck from the reversely bent portions 42, 42a are spring tongues 47, 47a each having the inner edges thereof reversely bent and presenting smooth gripping surfaces 49, 49a. There is also a central saddle portion 50 which may serve as a seat for the work piece assembled with this form of clip. Here, as in the firstdescribed form, a work piece is assembled to the clip by forcing the same downwardly against the spring fingers 47, 47a to pass the same and then engage the edges 46, 46a at which time the spring fingers and the arm portions are returned to a position with the edge portions 49, 49a also gripping the inserted work piece.

I claim:

1. A one-piece resilient sheet material clip adapted to support an elongate workpiece on an apertured work support; and comprising a stud element to be passed through the work support aperture for mounting the clip, and a head element for receiving the workpiece, said head element having a base portion with oppositely extending arms presenting substantially concave surfaces facing said stud element and terminating in laterally spaced bearing surfaces from which side arm portions extend upwardly, said side arm portions carrying depending arcuate end portions concave toward one another and disposed therebetween, the lower edge portions of said arcuate end portions forming gripping edges for a workpiece, and means providing spring fingers extending inwardly of the side arm portions and presenting additional opposed gripping edges for the workpiece.

2. A clip of the type claimed in claim 1, wherein the side arm portions include inwardly and downwardly inclined wall portions from which said spring fingers extend inwardly and from which said arcuate end portions depend.

3. A clip of the type claimed in claim 1, wherein the stud element includes laterally directed spring tongues to engage one surface of the work support when mounted thereon and serving to stress the oppositely extending arms on said base portion in engagement with the opposite surface of the work support.

4. A clip of the type claimed in claim 1, wherein the adjacent ends of the spring fingers are reversely bent to present smooth gripping edges and wherein the ends of the arcuate end portions are reversely bent to present smooth gripping edges.

5. A clip of the type claimed in claim 4, wherein there is provided a central saddle portion substantially traversing the space between said side arm portions and below the ends of said arcuate end portions.

6. A one piece resilient sheet metal clip adapted to support an elongate work piece on an apertured support, said clip including a head element and a stud element, said head element including bowed base means which is concave toward said stud element, a pair of arms which extend upwardly from opposite ends of said base means for a substantial distance away from said base means and thence inwardly and downwardly in reversely bent fashion toward said base means to form a throat terminating in gripping means for maintaining the work piece in spaced relation to said base means, said gripping means including a curvilinear element depending from each arm toward said base base means, each said curvilinear element presents opposite terminal gripping edges for the work piece, the inwardly and downwardly extending portions of said arms including spring fingers presenting spaced gripping edges for the work piece, and said stud element depending away from said arms and attached to a medial zenith portion of said base means.

References Cited

UNITED STATES PATENTS

| | | | |
|---|---|---|---|
| 307,761 | 11/1884 | Harger | 24—257 |
| 1,023,077 | 4/1912 | Grout | 24—73.7 |
| 1,906,874 | 5/1933 | Platt | 24—257 |
| 2,061,463 | 11/1936 | Hall | 248—73 |
| 2,166,916 | 7/1939 | Lombard | 24—73.7 |
| 2,315,211 | 3/1943 | Kost | 24—73 |
| 3,213,500 | 10/1965 | Thompson | 24—73.7 |

DONALD A. GRIFFIN, *Primary Examiner.*